United States Patent [19]
Petit et al.

[11] Patent Number: 5,441,559
[45] Date of Patent: Aug. 15, 1995

[54] ROTATABLE DEVICE FOR THE SEPARATION BY ADSORPTION OF AT LEAST ONE CONSTITUENT OF A GASEOUS MIXTURE

[75] Inventors: Pierre Petit, Buc; Michel Poteau, Dammartin en Goele; Jean-Marc Scudier, Chatel-Guyon; Xavier Vigor, Viroflay, all of France

[73] Assignee: l'Air Liquide, Societe Anonyme pour l'Etude et l'Exploitation des Procedes Georges Claude, Paris, France

[21] Appl. No.: 162,029
[22] PCT Filed: Mar. 23, 1993
[86] PCT No.: PCT/FR93/00288
  § 371 Date: Dec. 1, 1993
  § 102(e) Date: Dec. 1, 1993
[87] PCT Pub. No.: WO93/20925
  PCT Pub. Date: Oct. 28, 1993

[30] Foreign Application Priority Data
  Apr. 13, 1992 [FR] France .................. 92 04487

[51] Int. Cl.⁶ .............................................. B01D 53/06
[52] U.S. Cl. .............................. 96/125; 96/130; 96/144; 96/150
[58] Field of Search ............. 95/113; 96/121, 123, 96/125, 129, 130, 143–145, 150

[56] References Cited
U.S. PATENT DOCUMENTS

| | | | |
|---|---|---|---|
| 1,590,266 | 6/1926 | Tiedtke et al. | 96/145 |
| 2,680,492 | 6/1954 | Kopp | 96/125 |
| 2,877,861 | 3/1959 | Miller | 95/113 |
| 3,487,608 | 1/1970 | Gräff | 95/123 |
| 4,614,204 | 9/1986 | Dolejs | 137/625.11 |
| 4,614,205 | 9/1986 | Oroskar | 137/625.11 |
| 4,775,484 | 10/1988 | Schmidt et al. | 95/113 X |
| 4,778,492 | 10/1988 | Dawson | 96/125 X |
| 4,946,479 | 8/1990 | Izumo | 96/123 |
| 5,057,128 | 10/1991 | Panzica et al. | 96/125 X |
| 5,080,700 | 1/1992 | Bergloff et al. | 96/123 |
| 5,112,367 | 5/1992 | Hill | 95/130 X |
| 5,133,784 | 7/1992 | Boudet et al. | 95/113 X |

FOREIGN PATENT DOCUMENTS

| | | |
|---|---|---|
| 1007584 | 5/1952 | France . |
| 709018 | 9/1941 | Germany . |
| 3836856 | 5/1989 | Germany . |
| 239189 | 8/1926 | United Kingdom . |
| WO88/06913 | 9/1988 | WIPO . |

*Primary Examiner*—Robert Spitzer
*Attorney, Agent, or Firm*—Young & Thompson

[57] ABSTRACT

A rotary device including a plurality of vertical prismatic sectors mounted on a first annular plate comprising two arrays of gas passages which communicate with the outer and inner collectors of respective sectors, and interacting with a second plane annular plate on a housing defining a set of inner chambers. The second plate comprises two concentric arrays of apertures which communicate with corresponding chambers in the set of chambers, and are spread out along the path of the two gas passage arrays of the first plate. The device is particularly useful for producing oxygen.

10 Claims, 2 Drawing Sheets

ROTATABLE DEVICE FOR THE SEPARATION BY ADSORPTION OF AT LEAST ONE CONSTITUENT OF A GASEOUS MIXTURE

FIELD OF THE INVENTION

The present invention relates to rotatable devices for the separation by adsorption of at least one constituent of a gaseous mixture, of the type comprising a rotatable assembly of adsorption units each constituted by a vertical sector enclosing a mass of adsorbent extending between a vertical external collector and a vertical internal collector that are selectively connectable, during rotation of the assembly, to sequential means for supplying and withdrawing gas.

BACKGROUND OF THE INVENTION

A "PSA" ("Pressure Swing Adsorption device") of this type is described in the document EP-A-480.840 in the name of the applicant.

This document describes a device in which the gas distribution to and from the adsorption units is effected radially, the sequential supply and withdrawal means for the gas being confined to the interior of the rotatable assembly, in a voluminous arrangement which is difficult to produce and thus relatively troublesome.

SUMMARY OF THE INVENTION

The present invention has for its object to provide a PSA device of the type defined above, of simple and reliable conception, low production cost and permitting covering a wide range of uses.

To do this, according to a characteristic of the invention, the sectors are mounted on a first flat annular plate comprising a first and second series of gas passages communicating with the internal and external collectors of the respective sectors and coacting with a second flat annular plate mounted on a stationary housing defining a set of sectional chambers, the second plate having two series of openings communicating with corresponding chambers of the set of chambers and respectively distributed over the path of the first and second series of gas passages of the first plate.

According to other characteristics of the invention

- each sector comprises a base mounted on the first plate and comprising two radially spaced openings facing respectively a passage of the first and of the second series of passages of the first plate and communicating respectively with the external collector and the internal collector of the sector;
- the adsorbent mass of each sector rests on a base spaced vertically from the bottom of the sector and connected to this latter by a partition separating the two openings;
- the casing comprises a first and a second set of concentric chambers communicating selectively with the external and internal collectors of the sectors, respectively;
- the first set of chambers comprises a supply chamber, receiving the gaseous mixture under pressure, and, diametrically opposed, at least one depressurization chamber, typically connectable to a vacuum pump for the devices in which the low pressure of the cycle is less than the atmospheric pressure.

BRIEF DESCRIPTION OF THE DRAWINGS

Other characteristics and advantages of the present invention will become apparent from the following description of an embodiment, given by way of non-limiting illustration, with respect to the accompanying drawings, in which.

DETAILED DESCRIPTION OF THE INVENTION

The device which will now be described, with respect to the drawings, is more particularly adapted to a production cycle comprising a production stage with a stage at the high pressure of the cycle and supplied by a gaseous mixture according to two steps of pressure balancing or equilibriage with the production gas of the adsorber in its depressurization phase, followed by a depressurization phase under vacuum and a final step of elution under vacuum with the countercurrent introduction of production gas before repressurization in three steps, of which a final step is with countercurrent introduction of the production gas. The gaseous mixture to be separated is typically air and the gas produced is typically medium purity oxygen, the high pressure of the cycle not exceeding $1.8 \times 10^5$ Pa and the low pressure being no lower than $0.2 \times 10^5$ Pa.

Figure 3:
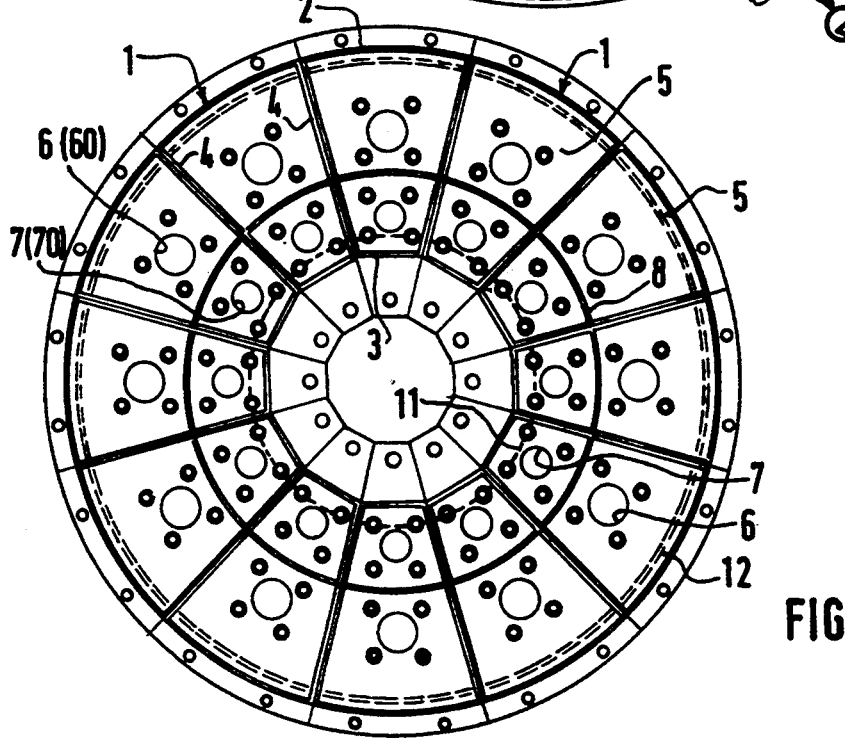

As will be seen in the drawings, the device according to the invention comprises a plurality of adsorption units each constituted by a vertical prismatic sector 1 with trapezoidal cross section forming a casing delimited by an external wall 2, an internal wall 3, lateral radial walls 4 and a base plate 5 of trapezoidal shape. The base plate comprises a radially outer opening 6 and a radially inner opening 7 between which extends a vertical partition 8 mounted in the base plate 5 and on which is secured a horizontal base plate 9 supporting a mass 10 of adsorbent confined radially between an internal screen 11 and an external screen 12. In assembled configuration, as will be seen in FIG. 3, the different sectors 1 constitute a circular crown closed at its upper part by a series of trapezoidal plates 13 each provided with an adsorbent filling opening 14. Each sector 1 preferably comprises at its upper portion a device 15 (mechanical or pneumatic) for compacting the adsorbent column 10.

The base plates 5 of the different sectors are fixed on a first flat annular plate 16 coacting, like a rotatable drawer, with the second flat annular plate 17 mounted on a circular support plate 18 on the lower portion of which is mounted a structure forming a housing 19 defining a certain number of gas distribution chambers, as will be seen above. The base plates 5 are centrally connected by a collar 20 forming a bearing 21 for a vertical axle 22 extending upwardly from the support plate 18. The upper closure plates 13 are connected by a central plate 23, the toroidal assembly of the sectors 1 being rigidified by hoops 24 and comprising means such as trunnions 25 for its handling and transportation.

The first plate 16 comprises two concentric series of passages 60, 70 facing the openings 6 and 7 of the base plates 5 of the sectors 1. As will be seen in FIG. 2, the second plate 17 comprises two radially spaced series of openings communicating with the casing chambers 19 and respectively distributed along the path of the gas passages 60, 70 of the first plate 16. In this same FIG. 2, it will be seen that the casing 19 comprises a first internal set and a second external set of concentric chambers, namely, in the illustrated example, externally, a chamber 26 extending about almost 180° and supplied by tubing 27 with a compressed gaseous mixture to be separated, in this instance air supplied by a compressor 28, a neutral chamber 29, a first depressurization chamber 30 connected via a conduit 31 to a first vacuum pump 32 and a second depressurization chamber 33 of larger angular opening, connected by tubing 34 to a second vacuum pump 35. The external crown of the casing 19 is completed by a neutral chamber 36. The set of internal chambers comprises a production chamber 37 contiguous to the supply chamber 26 and having the same angular extent as this latter, limited by two pressure balancing or equilibriage chambers 38A and 38B that are substantially diametrically opposed, communicating selectively with each other via a conduit 39 comprising a valve 40 and, contiguous to the chambers 38A and 38B, a second pair of equilibriage chambers 41A, 41B communicating selectively with each other by a conduit 42 comprising a valve 43. The angular extent of the chambers 38A and 41A (38B, 41B) corresponds to that of the neutral chambers (29 and 36). Contiguous to the depressurization chambers 30 and 33, and having the same angular extent as this latter, an elution chamber 44, diametrically opposed to the production chamber 37, communicates selectively with this latter by a conduit 45 comprising a valve 46. The production gas available in the chamber 26 is supplied to the user by tubing 47.

Figure 2:
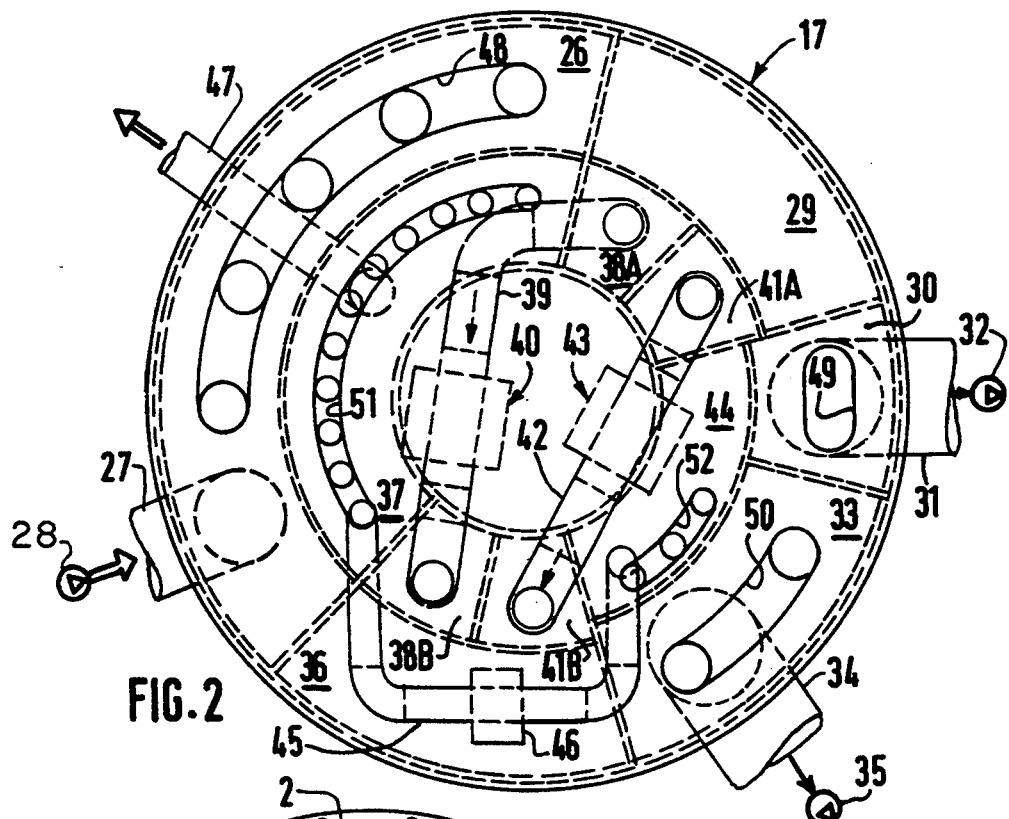
FIGS. 2 and 3 are cross-sectional views on the lines II—II and III—III of FIG. 1.

As will also be seen in FIG. 2, the active chambers communicate with the interface between the first plate 16 and the second plate 17 via openings formed in the support plate 18 and in the second plate 17. This latter comprises thus an elongated circular arcuate opening 48 covering a portion of the angular extent of the supply chamber 26, an opening 29 in alignment with the first pressure chamber 30, an elongated opening 50 in alignment with the second depressurization chamber 33 and covering a portion of the angular extent of this latter, and internally, an elongated opening 51 in alignment with the production chamber 37, covering the major portion of the angular extent of this latter and an elongated opening 52 in alignment with the elution chamber 44, covering substantially the same angular sector as the opening 50 of the chamber 33.

Figure 1:
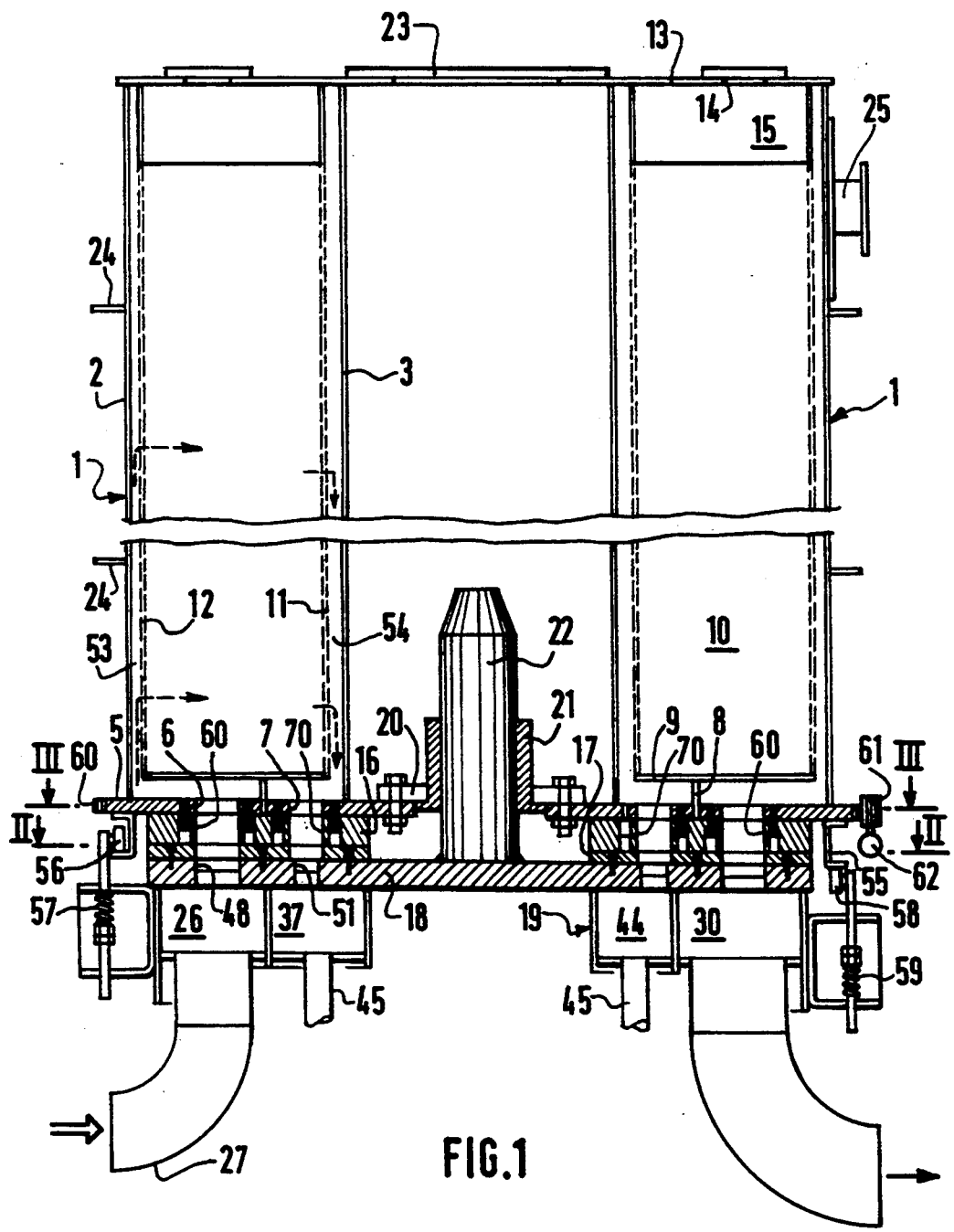
FIG. 1 is a schematic elevational view, partially in section, of a device according to the invention.

As will be seen in FIG. 1, the arrangement of each sector 1 defines, in this latter, a vertical external collector 53 in permanent communication with the opening 6 and the gas passage 60 and an internal vertical collector 54 in permanent communication with the opening 7 and the passage 70, all circulation of gas between the passages 60 and 70 being required to pass through the adsorbent mass 10 because of the base plate 9 and the partition 8. Thus, as shown on the left portion of FIG. 1, during the production phase, the air entering production chamber 26 passes through opening 48 and passage 6 into the external collector 53, passes radially through the adsorbent mass 10, from which results, in the internal collector 54, oxygen which is transmitted by the opening 70 and the passage 51, into the production chamber 37 for evacuation through the tubing 47 and/or via the conduit 45 toward the elution chamber 44. During continuous rotation of the assembly of sectors, these latter pass successively into alignment with the different chambers mentioned above to effect the production cycle described above.

During such a cycle, a portion of the rotating structure, situated in alignment with the supply chamber 26, will be under pressure, which pressure tends to space the first plate 16 from the second plate 17. To limit this tendency toward spacing, there is provided, below the base plates 5, a circular angle iron 55 whose lower wing forms a lower rolling track for at least a roller 56 elastically urged downwardly by a spring 57. By contrast, during a PSA vacuum cycle, a portion of the rotating structure, situated in alignment with the depressurization chamber 30, 33, is placed on the vacuum, which has a tendency to urge the first plate 16 firmly against the second plate 17. To alleviate this baring, the lower wing of the angle iron 55 forms forming an upper rolling track for at least one roller 58 elastically urged upwardly by a spring 59. The two plates 16 and 17 are preferably of material that is wear resistant and has a good coefficient of friction against each other. The two confronting surfaces are highly machined and slide on each other without play. As a modification, there could be provided very slight play between the two plates, avoiding friction between these latter, the upper plate 16 being for example fixed to a peripheral collar resting on a roller track (not shown) carried by the support plate 18. According to one aspect of the invention, the continuous driving in rotation of the assembly of the sectors 1 is effected by providing the periphery of the base plates 5 with a rack 60 coacting with a pinion 61 driven by a motor 62 carried by the support casing 19.

Although the present invention has been described with respect to a particular embodiment, it is not thereby limited but is on the contrary susceptible of modifications and variations which will be apparent to one skilled in the art.

We claim:

1. In a rotatable device for the separation by adsorption of at least one constituent of a gaseous mixture, comprising a rotatable assembly of a plurality of adsorption units each constituted by a vertical sector enclosing a mass of adsorbent extending between a vertical outer collector and a vertical inner collector that are selectively connectable, during rotation of the assembly, to gas supply and withdrawal means; the improvement wherein the sectors are mounted on a first annular flat plate comprising a first and a second series of gas passages communicating with the outer collectors and inner collectors of the sectors and coacting with a second flat annular plate mounted on a stationary housing defining a set of sectorial chambers, the second plate having two series of openings communicating with corresponding chambers of the set of chambers and respectively distributed along the path of the first and second series of gas passages of the first plate so as to provide an adsorption/desorption cycle by pressure variation in the adsorbent masses.

2. Device according to claim 1, wherein each sector comprises a base mounted on the first plate and comprising two radially spaced openings confronting respectively one passage of the first and one passage of the second series of passages of the first plate and communicating respectively with the outer collector and the inner collector of said sector.

3. Device according to claim 2, wherein the absorbent mass of each sector rests on a base spaced vertically from the bottom of the sector and connected to this latter by a partition separating the two openings.

4. Device according to claim 1, wherein the housing comprises a first and a second set of concentric chambers communicating selectively with the outer collectors and inner collectors of the sectors, respectively.

5. Device according to claim 4, wherein the first set of chambers comprises a supply chamber, receiving the gaseous mixture under pressure, and diametrically opposed, at least one depressurization chamber.

6. Device according to claim 5, wherein the second set of chambers comprises a production chamber contiguous to the supply chamber and at least two diametrically opposed pressure balancing chambers selectively connectable between themselves.

7. Device according to claim 5, further comprising means for urging the first plate against the second plate at least in a zone adjacent the supply chamber.

8. Device according to claim 5, wherein said at least one depressurization chamber is adapted to be connected to a vacuum pump, and means to limit the pressure of the first plate on the second plate opposite said at least one depressurization chamber.

9. Device according to claim 1, wherein the sectors have bottoms which are centrally connected to an annular structure forming a bearing for an axle carried by the housing.

10. Device according to claim 1, further comprising means to maintain the first plate spaced from the second plate without friction between them.

* * * * *